(Model.)
A. F. DELAFIELD.
DYNAMO ELECTRIC MACHINE.
No. 278,516. Patented May 29, 1883.
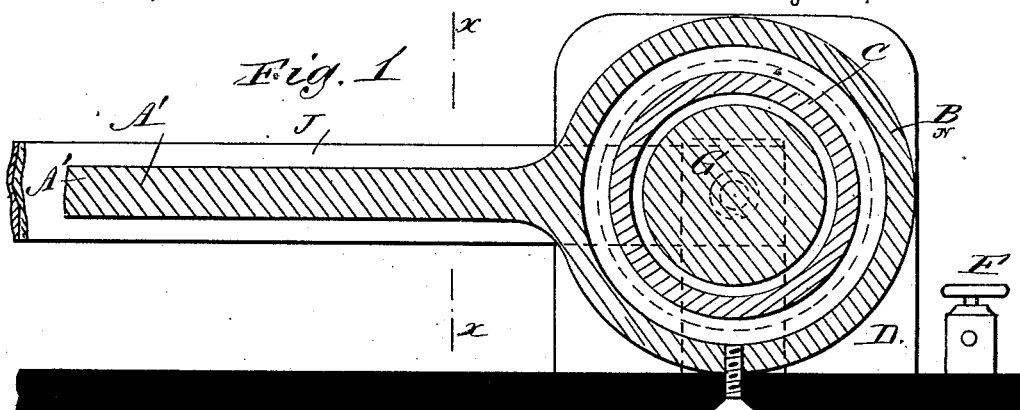
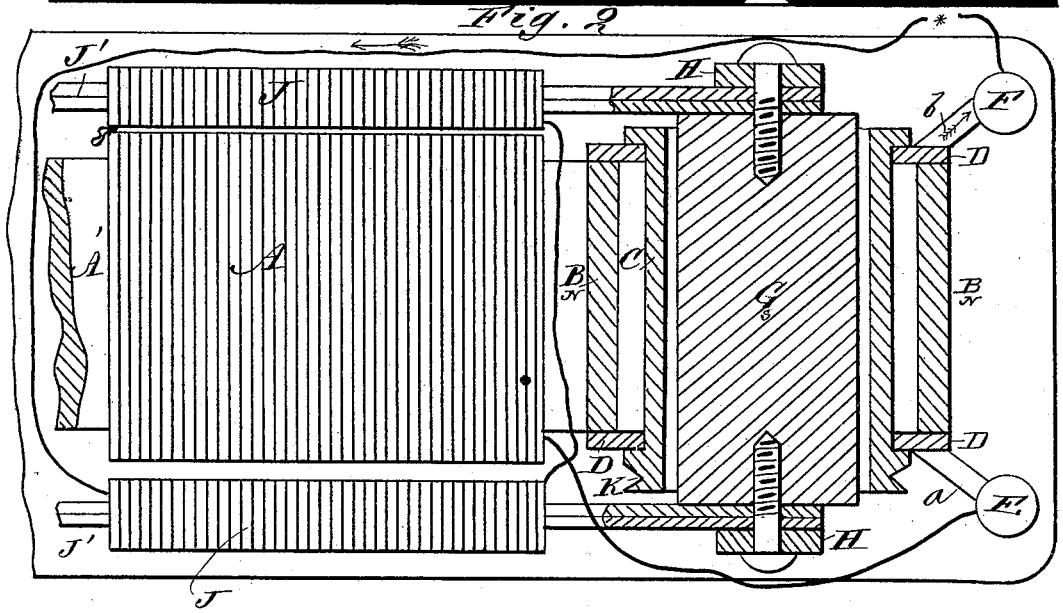
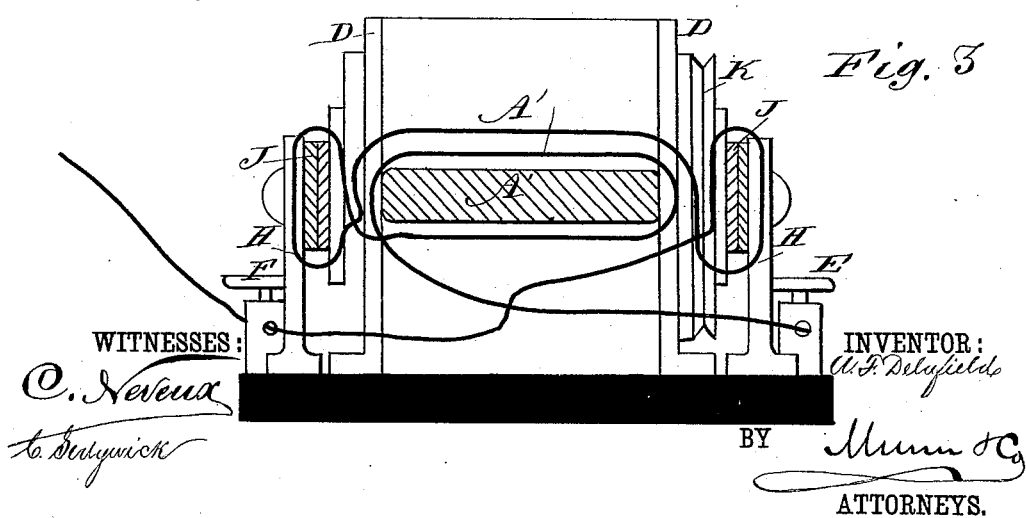

UNITED STATES PATENT OFFICE.

A. FLOYD DELAFIELD, OF NOROTON, CONNECTICUT.

DYNAMO-ELECTRIC MACHINE.

SPECIFICATION forming part of Letters Patent No. 278,516, dated May 29, 1883.

Application filed October 23, 1882. (Model.)

*To all whom it may concern:*

Be it known that I, A. FLOYD DELAFIELD, of Noroton, in the county of Fairfield, and State of Connecticut, have invented a new and Improved Dynamo-Electric Machine, of which the following is a full, clear, and exact description.

The object of my invention is to provide a new and improved dynamo-electric machine which has a uniform magnetic field, and thus does not require a commutator, whereby the entire construction of the machine will be materially simplified.

The invention consists in a dynamo-electric machine constructed with a rotating metal cylinder between a cylinder forming the head of a magnet, and a core within the rotating cylinder, the outer cylinder, and the core having opposite but uniform polarity. The ends of the magnets may be attached to the ends of the core, if desired.

Reference is to be had to the accompanying drawings, forming part of this specification, in which similar letters of reference indicate corresponding parts in all the figures.

Figure 1 is a longitudinal sectional elevation of one end of my improved dynamo-electric machine. Fig. 2 is a sectional plan view of the same. Fig. 3 is a cross-sectional elevation of the same on the line *x x*, Fig. 1.

The core A' of the field-magnet A has a transverse horizontal iron cylinder, B, secured to the end. The said cylinder contains a metal cylinder or armature, C, which fits loosely therein, and which is journaled in bearings D at the ends of the cylinder B, which bearings are made of conductive material, and are connected by conductors *a b* with the binding-posts E F. A cylindrical iron core, G, is contained within the cylinder or armature, and has its ends secured to standards H. The magnet B, the cylinder C, and the core G are concentric. The ends of the magnets J are secured to the standards H. In place of one magnet A, a series of like magnets may be used; but a single magnet is preferred. I have shown and described but one end of the machine, as both ends are alike, with the exception that the poles are reversed. A driving-pulley, K, is formed on one end of each armature. The wires of the magnet are wound around the core J' of one magnet J from right to left, around the core A' of the magnet A from left to right, and around the core J' of the other magnet J from right to left, so that if the pole of one pole-piece, B, of the magnet A is positive, the pole-piece G of the magnets J will be negative, and vice versa; and if one pole of the magnet A is positive the opposite pole is negative, and the opposite corresponding poles of the magnets J will be positive. The current passes from the armature C through the conductor *b* to the post F, from there to the light, then through the coils of the magnets J A to the binding-post E, the conductor *a*, and to the armature.

The magnets may be excited by a separate machine or battery; or the currents at one or both ends of the machine can be conducted through the magnets.

The machine consists of a cylinder-armature rotating between two cylindrical magnets on the inner and outer sides of the armature, the magnets having opposite polarity. The machine has thus a uniform magnetic field, and for that reason no commutators are required.

Either the magnets A or J may be dispensed with, for the induction from the remaining magnet produces sufficient polarity in the cylinder B or core G (according as the magnets A or J have been dispensed with) to operate the machine.

Having thus described my invention, what I claim as new, and desire to secure by Letters Patent, is—

1. In a dynamo-electric machine, the combination, with a field-magnet and a cylindrical head, of a metal cylinder or armature revolving in said cylindrical head, and a core within the cylinder, having its ends attached to magnets, substantially as herein shown and described.

2. In a dynamo-electric machine, the combination, with the field-magnet A, having a cylindrical head, B, of the metal cylinder or armature C within the said cylindrical head, the core G within the armature, the magnets J, having their ends connected to the ends of the core G, and means for rotating said cylinder or armature, substantially as herein shown and described.

3. In a dynamo-electric machine, the combination, with the field-magnet A, having a cylindrical head, B, and the standards D, of the metal cylinder or armature C, journaled in the said standards, and provided with the pulley K, the core G, the magnets J, having their ends attached to the ends of the core, and means for rotating the cylinder or armature, substantially as herein shown and described.

4. In a dynamo-electric machine, the combination, with the field-magnet A, having a cylindrical head, B, the standards D, and the core C, journaled in the said standards, and provided with the pulley K, of the core G, the magnets J, having their ends secured to the ends of the core, the conductors $a\,b$, connected to the standards, the binding-posts E F, and means for rotating the cylinder or armature, substantially as herein shown and described.

A. FLOYD DELAFIELD.

Witnesses:
OSCAR F. GUNZ,
C. SEDGWICK.